United States Patent
Ferguson et al.

(10) Patent No.: US 9,613,219 B2
(45) Date of Patent: Apr. 4, 2017

(54) MANAGING CROSS PERIMETER ACCESS

(75) Inventors: Geordon Thomas Ferguson, Mississauga (CA); Christopher Lyle Bender, Kitchener (CA); Alberto Daniel Zubiri, Richmond Hill (CA); Kenneth Cyril Schneider, Blue Mountains (CA); Oliver Whitehouse, Belmont (GB); Christopher William Lewis Hobbs, Ottawa (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 13/293,743

(22) Filed: Nov. 10, 2011

(65) Prior Publication Data
US 2013/0125198 A1    May 16, 2013

(51) Int. Cl.
*G06F 21/60* (2013.01)
*H04L 29/06* (2006.01)

(52) U.S. Cl.
CPC .......... *G06F 21/604* (2013.01); *H04L 63/102* (2013.01); *H04L 63/20* (2013.01)

(58) Field of Classification Search
CPC ..... H04L 63/102; H04L 63/20; H04L 67/306; H04W 12/08; G06F 21/604; G06F 9/5077; G06F 9/547
USPC ...................................................... 726/2–10
See application file for complete search history.

(56) References Cited

U.S. PATENT DOCUMENTS

| | | | |
|---|---|---|---|
| 5,774,551 A | 6/1998 | Wu et al. | |
| 5,826,265 A | 10/1998 | Van Huben et al. | |
| 6,088,693 A | 7/2000 | Van Huben et al. | |
| 6,125,447 A | * 9/2000 | Gong | 726/17 |
| 6,292,798 B1 | 9/2001 | Dockter et al. | |
| 6,405,202 B1 | 6/2002 | Britton et al. | |
| 6,408,336 B1 | 6/2002 | Schneider et al. | |
| 6,546,554 B1 | 4/2003 | Schmidt et al. | |
| 6,629,246 B1 | 9/2003 | Gadi | |
| 6,757,821 B1 | 6/2004 | Akiyama et al. | |

(Continued)

FOREIGN PATENT DOCUMENTS

| | | |
|---|---|---|
| CN | 1831833 | 9/2006 |
| CN | 1918549 | 2/2007 |

(Continued)

OTHER PUBLICATIONS

Research in Motion, "BlackBerry Bridge App 2.1 and Blackberry PlayBook Tablet 2.1, Security Technical Overview"; Version: 2.1; Jul. 17, 2012; 43 pages.

(Continued)

*Primary Examiner* — Tae Kim
(74) *Attorney, Agent, or Firm* — Fish & Richardson P.C.

(57) ABSTRACT

In some implementations, a method of managing access to resources in a single device including receiving, from a first resource assigned to a first perimeter, a request to access a second resource assigned to a second perimeter different from the first perimeter. The single device includes the first perimeter and the second perimeter. Whether access to the second resource is prohibited is determined based on a management policy for the first perimeter. The management policy defining one or more rules for accessing resources assigned to the second perimeter including the second resource.

18 Claims, 5 Drawing Sheets

(56) References Cited

U.S. PATENT DOCUMENTS

| | | |
|---|---|---|
| 6,772,350 B1 | 8/2004 | Belani et al. |
| 6,795,967 B1 | 9/2004 | Evans et al. |
| 6,799,208 B1 | 9/2004 | Sankaranarayan |
| 6,832,256 B1 | 12/2004 | Toga |
| 6,957,330 B1 | 10/2005 | Hughes |
| 6,976,241 B2 | 12/2005 | Cruz et al. |
| 7,185,192 B1 | 2/2007 | Kahn |
| 7,233,786 B1 | 6/2007 | Harris |
| 7,246,374 B1* | 7/2007 | Simon et al. ............ 726/16 |
| 7,315,750 B2 | 1/2008 | Chou et al. |
| 7,331,058 B1 | 2/2008 | Gladney |
| 7,353,533 B2 | 4/2008 | Wright |
| 7,469,417 B2 | 12/2008 | Fearnley et al. |
| 7,496,954 B1 | 2/2009 | Himawan |
| 7,526,800 B2 | 4/2009 | Wright et al. |
| 7,603,466 B2 | 10/2009 | Kilian-Kehr et al. |
| 7,689,653 B2 | 3/2010 | Cohen |
| 7,721,087 B1 | 5/2010 | DiPasquo et al. |
| 7,765,185 B2 | 7/2010 | Rangadass |
| 7,886,053 B1 | 2/2011 | Newstadt et al. |
| 7,890,627 B1 | 2/2011 | Thomas |
| 7,917,963 B2 | 3/2011 | Goyal et al. |
| 7,921,452 B2 | 4/2011 | Ridlon et al. |
| 8,187,100 B1 | 5/2012 | Kahn |
| 8,208,900 B2 | 6/2012 | Adler et al. |
| 8,344,135 B2 | 1/2013 | Hirose |
| 8,407,463 B2 | 3/2013 | Ghirardi |
| 8,495,700 B2 | 7/2013 | Shahbazi |
| 8,495,731 B1 | 7/2013 | Mar et al. |
| 8,503,340 B1 | 8/2013 | Xu |
| 8,588,749 B1 | 11/2013 | Sadhvani |
| 8,656,016 B1 | 2/2014 | Bender et al. |
| 8,799,227 B2 | 8/2014 | Ferguson |
| 8,856,349 B2 | 10/2014 | Jain |
| 8,869,235 B2 | 10/2014 | Qureshi |
| 8,909,915 B2 | 12/2014 | Ferren |
| 8,931,042 B1* | 1/2015 | Weiss .................. G06F 15/16 726/1 |
| 9,213,850 B2 | 12/2015 | Barton et al. |
| 9,256,758 B2 | 2/2016 | Draluk et al. |
| 2001/0047485 A1 | 11/2001 | Brown et al. |
| 2001/0056549 A1 | 12/2001 | Pinault et al. |
| 2002/0019944 A1 | 2/2002 | Kou |
| 2002/0029280 A1 | 3/2002 | Holden et al. |
| 2002/0095571 A1 | 7/2002 | Bradee |
| 2002/0112155 A1 | 8/2002 | Martherus et al. |
| 2003/0035397 A1 | 2/2003 | Haller et al. |
| 2003/0061087 A1 | 3/2003 | Srimuang |
| 2003/0233410 A1 | 12/2003 | Gusler |
| 2004/0177073 A1 | 9/2004 | Snyder et al. |
| 2004/0205342 A1 | 10/2004 | Roegner |
| 2004/0215702 A1 | 10/2004 | Hamasaki et al. |
| 2004/0260710 A1 | 12/2004 | Marston |
| 2004/0268151 A1 | 12/2004 | Matsuda et al. |
| 2005/0022023 A1 | 1/2005 | Chincheck et al. |
| 2005/0192008 A1 | 9/2005 | Desai et al. |
| 2005/0210270 A1 | 9/2005 | Rohatgi et al. |
| 2005/0213763 A1 | 9/2005 | Owen et al. |
| 2006/0015621 A1 | 1/2006 | Quinn |
| 2006/0090136 A1 | 4/2006 | Miller et al. |
| 2006/0120526 A1 | 6/2006 | Boucher et al. |
| 2006/0123485 A1* | 6/2006 | Williams ............... G06F 21/10 726/27 |
| 2006/0149846 A1 | 7/2006 | Schuba |
| 2006/0206931 A1 | 9/2006 | Dillaway et al. |
| 2006/0274750 A1 | 12/2006 | Babbar et al. |
| 2007/0050854 A1 | 3/2007 | Cooperstein et al. |
| 2007/0073694 A1 | 3/2007 | Picault et al. |
| 2007/0150730 A1 | 6/2007 | Conti |
| 2007/0156766 A1 | 7/2007 | Hoang et al. |
| 2007/0204153 A1* | 8/2007 | Tome et al. ............ 713/164 |
| 2007/0204166 A1* | 8/2007 | Tome et al. ............ 713/182 |
| 2008/0081609 A1 | 4/2008 | Burgan et al. |
| 2008/0130524 A1* | 6/2008 | Volach et al. ............ 370/259 |
| 2008/0137593 A1 | 6/2008 | Laudermilch et al. |
| 2008/0141136 A1 | 6/2008 | Ozzie |
| 2008/0184336 A1* | 7/2008 | Sarukkai et al. ............ 726/1 |
| 2008/0222694 A1* | 9/2008 | Nakae .................. H04L 63/20 726/1 |
| 2008/0222711 A1 | 9/2008 | Michaelis |
| 2008/0235041 A1* | 9/2008 | Cashdollar et al. ............ 705/1 |
| 2008/0263017 A1 | 10/2008 | Mazario |
| 2008/0313648 A1 | 12/2008 | Wang |
| 2008/0318616 A1 | 12/2008 | Chipalkatti et al. |
| 2009/0031393 A1 | 1/2009 | Denner |
| 2009/0070181 A1 | 3/2009 | Loeffen |
| 2009/0083643 A1 | 3/2009 | Beringer |
| 2009/0178107 A1 | 7/2009 | Karjoth et al. |
| 2009/0181662 A1 | 7/2009 | Fleischman et al. |
| 2009/0260052 A1* | 10/2009 | Bathula et al. ............ 726/1 |
| 2009/0300707 A1 | 12/2009 | Garimella et al. |
| 2010/0024016 A1* | 1/2010 | Violleau ............... G06F 21/335 726/7 |
| 2010/0100825 A1 | 4/2010 | Sharoni |
| 2010/0107215 A1 | 4/2010 | Bechtel et al. |
| 2010/0153969 A1 | 6/2010 | Dyba et al. |
| 2010/0175104 A1 | 7/2010 | Khalid |
| 2010/0184440 A1 | 7/2010 | Mao et al. |
| 2010/0222097 A1 | 9/2010 | Gisby et al. |
| 2010/0242086 A1 | 9/2010 | Adams et al. |
| 2010/0278162 A1 | 11/2010 | Groux et al. |
| 2010/0281487 A1* | 11/2010 | Schneider et al. ............ 718/104 |
| 2010/0299152 A1 | 11/2010 | Batchu |
| 2010/0319053 A1 | 12/2010 | Gharabally |
| 2010/0325710 A1 | 12/2010 | Etchegoyen |
| 2011/0010699 A1 | 1/2011 | Cooper et al. |
| 2011/0030045 A1* | 2/2011 | Beauregard ............ G06F 9/468 726/9 |
| 2011/0099605 A1 | 4/2011 | Cha et al. |
| 2011/0126214 A1 | 5/2011 | O'Farrell et al. |
| 2011/0145833 A1 | 6/2011 | De Los Reyes et al. |
| 2011/0179083 A1 | 7/2011 | Galloway et al. |
| 2011/0195698 A1 | 8/2011 | Pearce |
| 2011/0210171 A1 | 9/2011 | Brown et al. |
| 2011/0246753 A1 | 10/2011 | Thomas |
| 2011/0252234 A1 | 10/2011 | De Atley |
| 2011/0252240 A1 | 10/2011 | Freedman et al. |
| 2011/0270963 A1 | 11/2011 | Saito et al. |
| 2011/0307946 A1 | 12/2011 | Hilerio |
| 2011/0314467 A1 | 12/2011 | Pearson |
| 2012/0005477 A1 | 1/2012 | Wei et al. |
| 2012/0005723 A1 | 1/2012 | Chaturvedi et al. |
| 2012/0005745 A1 | 1/2012 | Wei et al. |
| 2012/0054853 A1 | 3/2012 | Gupta et al. |
| 2012/0066691 A1 | 3/2012 | Branton |
| 2012/0079110 A1 | 3/2012 | Brown et al. |
| 2012/0079586 A1 | 3/2012 | Brown et al. |
| 2012/0079609 A1 | 3/2012 | Bender et al. |
| 2012/0084184 A1 | 4/2012 | Raleigh et al. |
| 2012/0109826 A1 | 5/2012 | Kobres |
| 2012/0144196 A1 | 6/2012 | Owen et al. |
| 2012/0157165 A1 | 6/2012 | Kim et al. |
| 2012/0185510 A1* | 7/2012 | Desai .................. G06F 21/6281 707/785 |
| 2012/0185661 A1* | 7/2012 | Desai .................. G06F 12/1491 711/163 |
| 2012/0185930 A1* | 7/2012 | Desai .................. G06F 21/6218 726/13 |
| 2012/0202527 A1 | 8/2012 | Obradovich et al. |
| 2012/0214442 A1 | 8/2012 | Crawford et al. |
| 2012/0304280 A1 | 11/2012 | Hayashida |
| 2012/0324067 A1 | 12/2012 | Hari et al. |
| 2013/0097316 A1* | 4/2013 | Bender .................. H04L 63/102 709/225 |
| 2013/0097657 A1* | 4/2013 | Cardamore ............ H04L 63/20 726/1 |
| 2013/0124583 A1 | 5/2013 | Ferguson et al. |
| 2013/0346606 A1 | 12/2013 | Ryerson et al. |

(56) References Cited

U.S. PATENT DOCUMENTS

| | | |
|---|---|---|
| 2014/0006347 A1 | 1/2014 | Qureshi |
| 2014/0330990 A1 | 11/2014 | Lang |

FOREIGN PATENT DOCUMENTS

| | | |
|---|---|---|
| CN | 101004776 | 7/2007 |
| CN | 101253487 | 8/2008 |
| EP | 332558 | 9/1989 |
| EP | 0605106 | 7/1994 |
| EP | 1806674 | 7/2007 |
| EP | 2337300 | 6/2011 |
| GB | 2408179 | 5/2005 |
| GB | 2440015 | 1/2008 |
| WO | 2004017592 | 2/2004 |
| WO | 2005/062279 | 7/2005 |
| WO | 2006/130807 | 12/2006 |
| WO | 2007048251 | 5/2007 |
| WO | 2009/012329 | 1/2009 |
| WO | 2009014975 | 1/2009 |
| WO | 2012109497 | 1/2009 |
| WO | 2012037656 | 3/2012 |
| WO | 2012037657 | 3/2012 |
| WO | 2012037658 | 3/2012 |

OTHER PUBLICATIONS

Research in Motion, "BlackBerry Device Service 6.1 and BlackBerry PlayBook Tablet 2.1, Security Technical Overview" ; Version: 6.1; Sep. 17, 2012; 90 pages.
Office Action issued in U.S. Appl. No. 10/524,353 on Sep. 21, 2012; 16 pages.
Office Action issued in U.S. Appl. No. 13/098,456 on Sep. 13, 2012; 20 pages.
International Search Report and Written Opinion issued in International Application No. PCT/CA2011/001058 on Dec. 21, 2011; 9 pages.
Ferguson et al., U.S. Appl. No. 13/293,743, "Managing Cross Perimeter Access," filed Nov. 10, 2011.
Office Action issued in U.S. Appl. No. 13/398,676 on Sep. 5, 2012; 21 pages.
Extended European Search Report issued in European Application No. 11186802.2 on Jan. 18, 2012; 7 pages.
Extended European Search Report issued in European Application No. 11186796.6 on Jan. 18, 2012; 8 pages.
Microsoft Office: Microsoft Outlook 2010 Product Guide; Microsoft Corp.; published in 2010; 65 pages.
Windows 7 Product Guide; Microsoft Corp.; published in 2009; 140 pages.
Extended European Search Report issued in European Application No. 12173030.3 on Nov. 22, 2012; 6 pages.
Chen, Zhigun; "Java Card Technology for Smart Cards: Architecture and Programmer's Guide"; Internet citation; Jun. 2, 2000; Retrieved from the internet: <http://developer.java.sun.com/developer/Books/consumerproducts/javacard/ch09.pdf>.
Extended European Search Report issued in European Application No. 11188696.6 on Apr. 12, 2012; 7 pages.
Google Inc.; Android 2.3.4 User's Guide; May 20, 2011; 384 pages.
Microsoft Corp.; Microsoft Outlook 2010; Released Jul. 15, 2010; 27 pages.
Office Action issued in U.S. Appl. No. 13/274,913 on Jan. 23, 2013; 22 pages.
International Search Report and Written Opinion issued in International Application No. PCT/CA2012/050797 on Feb. 5, 2013; 8 pages.
Office Action issued in U.S. Appl. No. 13/25,097 on Feb. 28, 2013; 18 pages.
Extended European Search Report issued in European Application No. 12189773.0 on Mar. 7, 2013; 8 pages.

International Search Report and Written Opinion of the International Searching Authority issued in International Application No. PCT/CA2012/050796 on Feb. 21, 2013; 13 pages.
IETF RFC 3530; "Network File System (NFS) Version 4 Protocol"; Apr. 2003.
"Secure Inter-Process Communication"; Apr. 4, 2004. Retrieved from internet on Jan. 20, 2014 https://web.archive.org/web/20040404015137/http://cr.yp.to/docs/secureipc.html.
Notice of Allowance issued in Canadian Application No. 2,769,646 on Feb. 15, 2013; 1 page.
Examiner's First Report issued in Australian Application No. 2012203391 on Jan. 22, 2014; 4 pages.
Advisory Action issued in U.S. Appl. No. 13/293,743 on Nov. 26, 2013; 3 pages.
Advisory Action issued in U.S. Appl. No. 13/275,097 on Dec. 6, 2013; 4 pages.
Office Action issued in U.S. Appl. No. 13/722,213 on Dec. 4, 2013; 6 pages.
Notice of Allowance issued in U.S. Appl. No. 13/722,213 on Jan. 29, 2014; 7 pages.
International Preliminary Report on Patentability under Chapter II issued in International Application No. PCT/CA2012/050797 on Feb. 12, 2014; 13 pages.
Office Action issued in U.S. Appl. No. 13/529,509 on Mar. 25, 2014.
International Preliminary Report on Patentability under Ch. II issued in International Application No. PCT/CA2012/050796 on Mar. 10, 2014; 18 pages.
Communication Pursuant to Article 94(3) EPC issued in European Application No. 11186796.6 on Aug. 29, 2014; 5 pages.
Office Action issued in Canadian Application No. 2,792,772 on Sep. 5, 2014; 3 pages.
Office Action issued in Canadian Application No. 2,792,707 on Sep. 8, 2014; 3 pages.
Notice of Acceptance issued by Australian Application No. 2012203391 on Jul. 25, 2014; 2 pages.
Communication pursuant to Article 94(3) issued in EP Application No. 11186802.2 on Aug. 25, 2014.
Office Action issued in U.S. Appl. No. 13/293,743 on Jul. 16, 2014.
Office Action issued in U.S. Appl. No. 13/274,913 on Jul. 1, 2014.
Office Action issued in U.S. Appl. No. 13/25,097 on Jul. 16, 2014.
Office Action issued in U.S. Appl. No. 13/659,561 on Jul. 2, 2014.
Extended European Search Report mailed Mar. 17, 2014 in European Application No. 11162178.5.
Office Action issued in Chinese Application No. 201110308441.4 on Jul. 8, 2014; 4 pages. No translation.
Office Action issued in U.S. Appl. No. 13/296,963 on Oct. 3, 2014.
United States Office Action in U.S. Appl. No. 13/25,097, dated Feb. 24, 2015, 22 pages.
United States Office Action in U.S. Appl. No. 13/801,437, dated Mar. 2, 2015, 53 pages.
United States Office Action in U.S. Appl. No. 13/274,913, dated Dec. 5, 2014.
United States Office Action in U.S. Appl. No. 13/659,561, dated Dec. 10, 2014.
United States Office Action in U.S. Appl. No. 14/163,416, dated Feb. 17, 2015, 12 pages.
European Communication Pursuant to Article 94(3) EPC in European Application No. 12189773.0, dated Feb. 5, 2015, 6 pages.
Chinese Office Action in Chinese Application No. 201110308441.4, dated Jan. 20, 2015, 5 pages.
Office Action issued in Canadian Application No. 2,820,687 on Nov. 3, 2014; 3 pages.
United States Office Action in U.S. Appl. No. 13/275,097, dated Feb. 24, 2015, 22 pages.
Boyce, "Microsoft Outlook 2010 Inside Out," XP055196121, Microsoft Press, Aug. 15, 2010, 152 pages.
Extended European Search Report in European Application No. 12847536.5, dated Jun. 29, 2015, 8 pages.
United States Office Action in U.S. Appl. No. 13/529,509, dated Apr. 8, 2015, 13 pages.

(56) References Cited

OTHER PUBLICATIONS

Saha Saurabh, "Auto-Open Certain Websites in Google Chrome Incognito Private Mode", Dec. 31, 2012, <http://web.archive.org/web/20121231021254/http://www.techgyd.com/auto-open-sites-in-google-incognito/360>, 5 pages.
Extended European Search Report issued in European Application No. 13165229.9 on Nov. 10, 2015.
Office Action issued in Chinese Application No. 201180065344.5 on Jun. 3, 2016.
Communication Pursuant to Article 94(3) EPC issued in related European Application No. 11186802.2 on Mar. 14, 2016.
Communication Pursuant to Article 94(3) EPC issued in related European Application No. 12847536,5 on Mar. 16, 2016.
Communication Pursuant to Article 94(3) EPC issued in European Application No. 12173030.3 on Sep. 8, 2016.
Office Action issued in Chinese Application No. 201310504548.5 on Sep. 5, 2016.
Office Action issued in Chinese Application No. 201280066860.4 on Sep. 18, 2016.
Office Action issued in Canadian Application No. 2792707 on Sep. 28, 2016.
Office Action issued in Chinese Application No. 201310503089.9 on Sep. 28, 2016.
Bugiel et al, "Practical and lightweight domain isolation on android," in Proceedings of the 1st ACM workshop on Security and privacy in smartphones and mobile devices, pp. 51-62. ACM, 2011.
Office Action issued in Chinese Application No. 201280066715.6 on Nov. 10, 2016.

\* cited by examiner

MANAGING CROSS PERIMETER ACCESS

TECHNICAL BACKGROUND

This disclosure relates to managing access to resources on a device.

BACKGROUND

In many instances, computational devices may include data, application, and/or network resources whose accessibility is controlled by security protocols. For example, resources such as user accounts, administration rights, password protection, database management, and others may be managed by or otherwise associated with different entities (e.g., an enterprise, a user).

DESCRIPTION OF DRAWINGS

Like reference symbols in the various drawings indicate like elements.

DETAILED DESCRIPTION

In some implementations, a single user device may include multiple perimeters that logically separate computer resources (e.g., applications, data, network access, configuration files) such that a perimeter may be prevented from accessing resources included in a different perimeter. For example, the perimeters may prevent personal resources in one perimeter may be prevented from accessing corporate resources in another perimeter or vice-versa. Keeping corporate data, applications, and networks isolated from personal data, applications, and networks is desirable because a user can use a single device to separately access the different groups of resources. In other words, an enterprise may extend a secured perimeter on a single user device without interfering with the user's personal experience on the same device. This disclosure is directed to enabling cross perimeter access based on one or more policies. In other words, resources in a perimeter may be accessed by a different perimeter based on a policy assigned to the requesting perimeter or a policy assigned to the target perimeter. Managing cross perimeter access includes controlling what information can be transferred between the perimeters and, specifically, what data and networks can be accessed by applications that are executed within the perimeters and what perimeter resources (if any) can be accessed by applications external to the perimeter.

In some implementations, access to perimeter resources can be controlled by defining, assigning or otherwise associating a policy to each perimeter. The policy can identify external perimeters accessible by internal resources or internal resources that are or are not accessible by external resources. In addition to identifying what resources (e.g., data, network access) are accessible, the policy may identify specific users that can or cannot access specified resources. In some examples, the policy may identify that a specific user accessing an external resource can access a portion of the internal data. In some examples, a resource access policy for file data can identify that the file is visible to any application that is executing within the perimeter but only available to a specific trusted application executed outside the perimeter. In short, a resource policy can define access to both the external resources (in another perimeter) that can be accessed by internal applications (running in the perimeter) and internal resources that can be accessed by external applications. In some implementations, the policies from both perimeters determine whether access is granted, or, if there is a conflict, the strictest policy can be applied.

Figure 1:
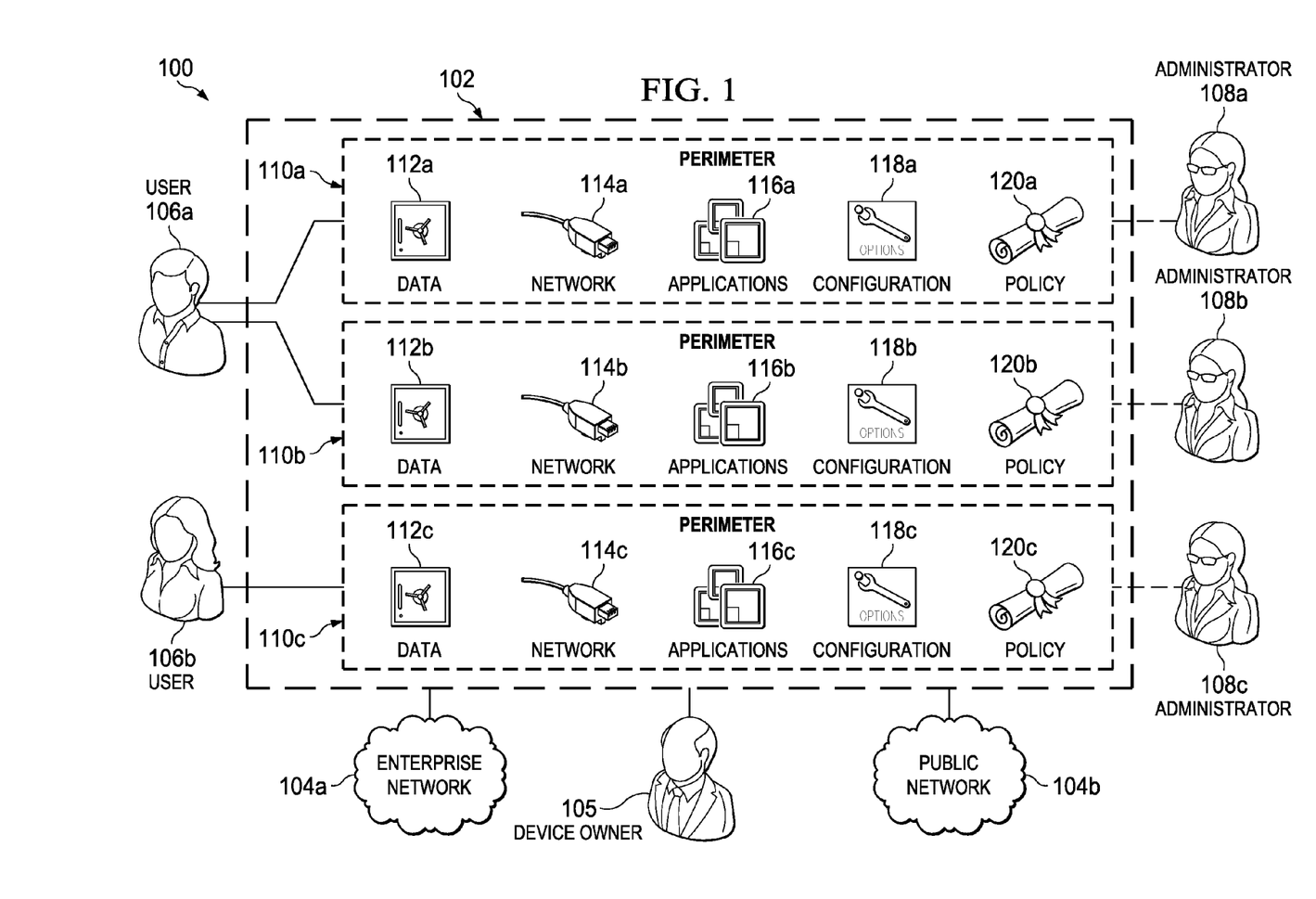
FIG. 1 illustrates an example system for managing cross perimeter access.

Turning to an example environment, FIG. 1 illustrates an example system 100 for managing cross perimeter access of resources in accordance with one or more implementations of the present disclosure. For example, the system 100 may enable perimeter administration such that policies for perimeters may identify resources that are accessible by specific resources external to the perimeter. As previously mentioned, a perimeter may generally refer to a logical separation of computing resources such that transferring data between perimeters and accessing other perimeter resources are prohibited. In some implementations, the system 100 may include policies that provide exceptions to these prohibitions. For example, the system 100 may identify one or more specific resources external to a perimeter that may access data, an application, or other resources. In general, a resource may include applications, file systems, network access, or other computer resources. In addition to enabling access to resources within a perimeter, the system 100 may include a policy that identifies specific external resources that a resource in a perimeter may access. The system 100 may also resolve conflicts between policies of two perimeters. For example, the system 100 may default to the strictest policy in the event that a policy for one perimeter allows access to a resource and the policy for another policy denies access. In some implementations, the system 100 may include policies that are based on a resource or an aspect of a resource such that access is granted to less than the entire resource. By enabling such policies, the system 100 may enable administrators greater control in cross perimeter access. In addition, the system 100 may manage a seamless user experience in which the perimeter concept is executed. Cross perimeter access may allow applications in one perimeter to access data in another which in turn delivers the value add of the application in question within the other perimeter.

As for a high-level description, the system 100 includes a device 102 communicably coupled to networks 102a and 102b (individually and collectively referred to as 102). In addition, the device 102 may interact with a device owner 110, users 106a and 106b (individually and collectively referred to as 106), administrators 108a, 108b, 108c (individually and collectively referred to as 108), a combination of the foregoing, or others. The device 102 includes multiple perimeters 110a, 100b, 110c (individually and collectively referred to as 110). Each perimeter 110 includes data 112, network access resource 114 for providing access to networks, one or more applications 116 for providing services to users 106, configurations 118 for configuring resources, and one or more policies 120 for defining cross perimeter access. As for a high-level description of operation, the device owner 104 or the administrator 108 may generate perimeters 110 including data 112, network access resource 114, applications 116, configurations 118, and one or more policies 120. While the perimeters 110 are illustrated as including all of the resources, a perimeter 110 may include only a subset of the illustrated resources without departing from the scope of the disclosure. For example, a perimeter 110 may not include network access resource 114. In response to a user 106 requesting access to data 112 or network access resource 114 external to a perimeter 110, the device 110 may determine whether the policy 120 for the perimeter 110 currently accessed by the user 106 and the policy 120 for the requested perimeter 110 both grant access to the identified resource. For example, the user 106a may request access to the data 112c while accessing the perimeter 110a and the device 102 may determine whether the policy 120a and 120c grant access to the perimeter 110a.

Turning to a more detailed description of the elements of the system 100, the device 102 may comprise any computing device operable to receive requests from the user via a user interface, such as a Graphical User Interface (GUI), a CLI (Command Line Interface), or any of numerous other user interfaces. Thus, where reference is made to a particular interface, it should be understood that any other user interface may be substituted in its place. In various implementations, the device 102 comprises an electronic computing device operable to receive, transmit, process and store any appropriate data associated with the system 100. As used in this disclosure, the device 102 may comprise a tablet computer, a personal computer, a laptop computer, touch screen terminal, workstation, network computer, kiosk, wireless data port, wireless or wireline phone, personal data assistant (PDA), smartphone, at least one processor within these or other devices, or any other suitable processing device. For example, the device 102 may comprise a mobile device that includes an input device, such as a keypad, touch screen, mouse, or other device that can accept information, and an output device that conveys information associated with the operation of the resources, including digital data, visual information, or GUI. Both the input device and output device may include fixed or removable storage media such as a magnetic computer disk, CD-ROM, or other suitable media to both receive input from and provide output to users of terminals 106 through the display, such as a GUI.

In the illustrated implementation, the device 102 includes the perimeters 110a-c configured to prevent access to one or more resources assigned to the perimeter. For example, the perimeter 110 may include password protection, encryption, and other process for controlling access to resources assigned to the perimeter. A perimeter 110 may be generated by the device owner 104, a user 106, an administrator 108, or others. In some examples, the perimeter 110a may be a personal perimeter created by default for the user 106a and managed by the user 106a. In some examples, the perimeter 110a may be an enterprise perimeter created by an administrator 108a for an enterprise and may be managed by a remote management server. In addition, a given perimeter 110 may be accessed by the device owner 104, a user 106, an administrator 108, a combination of the foregoing, or others. In some implementations, each perimeter may be associated with a single user 106, and at least some users 106 may access multiple device perimeters 110. For example, the user 106a may access resources within both the perimeter 110a and the perimeter 110b, and the user 106b may have only one perimeter 110c. The device owner 105 may have the ability to remove individual perimeters 110 from the device 102. In some implementations, the user 106 may create a perimeter 110 through the enrollment process. As part of the enrollment process, the organization associated with the enterprise network 102a may transmit information identifying the initial resources for the perimeter 110 to the device 102 including applications, configuration and policies. The perimeter administrator 108a-c may assign policies 120 for the perimeters 110 and initiate perimeter updates. In some implementations, the perimeter administrators 108 may remotely lock and/or wipe the perimeters 110.

In the illustrated implementation, a given perimeter 110 includes data 112, network access resource 114, applications 116, configurations 118, a policy 120, a combination of the foregoing, or other resources. The data 112 may be stored in any memory or database module and may take the form of volatile or non-volatile memory including, without limitation, magnetic media, optical media, random access memory (RAM), read-only memory (ROM), removable media, or any other suitable local or remote memory component. The data 112 may include various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the device 102 and its applications 116. Additionally, the data 112 may include any other appropriate data, such as data associated with VPN applications, firmware logs and policies, firewall policies, a security or access log, print or other reporting files, as well as others.

The network access resource 114 includes any parameters, variables, policies, algorithms, instructions, settings, or rules for granting access to the network 102a or 102b or other network. For example, the network access resource 114 may include or identify firewall policies for accessing the enterprise network 104a. In some implementations, the network access resource 114 include or otherwise identify one or more of the following: a username; a password; a security token; a Virtual Private Network (VPN) configuration; firewall policies; a communication protocol; encryption key certificate; or others.

The applications 116 may comprise any application, program, module, process, or other software that may execute, change, delete, generate, or otherwise manage business information according to the present disclosure. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the device 102, one or more processes associated with the application 116 may be stored, referenced, or executed remotely. For example, a portion of the application 116 may be an interface to a web service that is remotely executed. Moreover, the application 116 may be a child or sub-module of another software module or enterprise application (not illustrated) without departing from the scope of this disclosure. In some implementations, the application 116 may be a hosted solution that allows multiple parties in different portions of the process to perform the respective processing. For example, the enterprise network 102 may access the application 116 on the device 102 or even as a hosted application located over network 102b without departing from the scope of this disclosure. In another example, portions of the application 116 may be used by the user 106 working directly at the device 102, as well as remotely via enterprise network 102a.

The configuration files 118 includes any parameters, variables, policies, algorithms, instructions, settings, or rules for configuring software of the device 102. For example, the configuration files 118 may include a table that identifies settings for one or more applications 116. In some implementations, the configuration file 118 identifies initial settings for one or more applications 116. In addition to user applications 116, the configuration file 118 may identify settings for other types of applications such as operating system settings. The files 118 may be often written in ASCII and line-oriented, with lines terminated by a newline or carriage return/line feed pair, depending on the operating system.

The policy 120 includes any parameters, variables, policies, algorithms, instructions, settings, or rules for enabling cross perimeter access. For example, the policy 120a may identify one or more resources external to the perimeter 110a and accessible by a process executed internal to the perimeter 110a. In some implementations, the policy 120 may include or otherwise identify one or more of the following: a specific resource; an internal resource; a portion of a resource; a user; an owner; an administrator; an action type; a time period; or other information. In regards to external resources, the policy 120 may identify a specific resource external to the assigned perimeter 110 that can access internal resources. In some implementations, the policy 120 may identify specific resources that the external resource may access. For example, the policy 120a may identify that a specific trusted application in the applications 116b may access the data 112a or the network access resource 114a. In some implementations, the resource policy 120 defines access to both the external resources (in another perimeter 110) that can be accessed by internal applications 116 (running in the perimeter 110) and for internal resources that can be accessed by external applications 116. The policy 120 may be scoped to internal or external applications. In some implementations, perimeter access policies 120 may be applied to data (e.g., file system locations, networks access 114, applications 116). The access policies 120 may allow a controlled means for perimeters administrators 108 to manage, share and secure perimeters assets (data 112, network access resource 114, applications 116). In some implementations, the perimeter policy 120 may define which applications 116 may communicate across perimeters 110. Action type may include one or more of the following: copying, cutting, or pasting data; accessing specific network or type of network; or other types of action.

In some implementations, a policy 120 may define or otherwise identify a process for user authentication prior to enabling cross perimeter access. For example, the policy 120 may identify the type and content of user authentication (e.g., password strength, lifecycle) to apply to a cross-perimeter request. When the user 106 requests access to multiple perimeters 110, the request may be evaluated by both an internal policy 120 and an external policy 120. If both the policies 120 grant access, then the resource may execute the cross perimeter access. Otherwise, the more restrictive policy 120 may determine whether the resource is granted cross perimeter access. In terms of network resource accessibility, the policies 120 may identify or include information to determine which network accesses can be used by an external resource such as an application 116 executed in a different perimeter 110.

The device 102 may be connected to multiple networks, such as the enterprise network 104a and the public network 104b. The enterprise network 104a is a network associated with an enterprise. The enterprise may comprise a corporate or business entity, a government body, a non-profit institution, or any other organization connected to the device 102. The enterprise may be the owner 104 of device 102. Of course, the enterprise may also lease the device 102 or may hire contractors or agents who are responsible for maintaining, configuring, controlling, and/or managing the device 102. In the illustrated embodiment, the networks 104 facilitate wireless and/or wireline communication with the device 102. The networks 104 may communicate, for example, Internet Protocol (IP) packets, Frame Relay frames, Asynchronous Transfer Mode (ATM) cells, voice, video, data, and other suitable information between network addresses. In addition, while the enterprise network 104a and the public network 104b are each illustrated as a single network, each network 102 may comprise a plurality of networks. In short, the enterprise network 104a and the public network 104b are any suitable network that configured to communicate with the device 104.

In some aspects of operation, a user 106 may access the application 116a in perimeter 110a and submit a request to access data 112c in perimeter 110c. In response to at least the request, the device 102 may identify the policy 120 assigned to the perimeter 110a and determine whether the policy 120a grants the application 116a to the data 112c. In addition, the device 102 may also identify the policy 120c assigned to the perimeter 110c to determine whether the policy 120a denies the application 116a access to the data 112c. If both allow access to the data 112c, the application 116a may transfer a portion of the data 112c to the perimeter 110a. Otherwise, the application 116a may be denied access or the device 102 may implement the more restrictive policy 120 in the event of a conflict.

Figure 2:
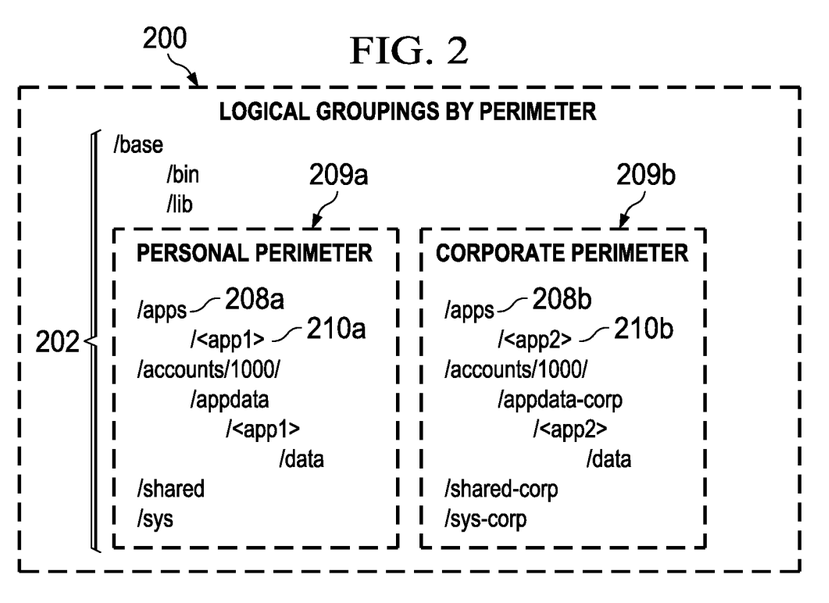
FIG. 2 is a block diagram of a device including an example perimeter file system resources for managing cross perimeter access.

FIG. 2 illustrates an example device 200 including a perimeter file system resources 202 according to some implementations of the present disclosure. In these implementations, the device 200 includes a logical grouping by perimeter defined by perimeter policies such as a personal perimeter 209a and a corporate perimeter 209b. The perimeter file system resources 202 may leverage a QNX encryption domain constructed to secure assets. The QNX is a commercial Unix-like real-time operating system for embedded systems. The perimeter file system resources 202 may allow administrator to indicate that assets may be stored unencrypted. For example, if a resource is designated to be shared, the perimeter file system resources 202 may indicate the resource is unencrypted.

In some implementations, the perimeter file system resources 202 may enable logical grouping of the file system resources such that the overarching application and account structure designed for the device 200 can be effectively partitioned by perimeters, such as the personal perimeter 209a and the corporate perimeter 209b. As illustrated, the grouped perimeters 210 and 220 may indicate information in the fields of application, application perimeter, user, target, target perimeter and permissions. As such, accessibility can be defined for each perimeter by describing the application to which the policy applies.

In some implementations, the application field 208a may include values 210a that indicate the personal perimeter 209a applies to all applications (i.e. for all authors, identifications, versions). Application-ID values 210a may indicate that the personal perimeter 209a applies to all versions of the specified application, the personal perimeter 209a applies to any application published by the specified author, the personal perimeter 209a applies to a specific version of the application, or others. Similarly, the application field 208b may include values 210b that indicate the corporate perimeter 209b applies to all applications (i.e. for all authors, identifications or versions), the corporate perimeter 209b applies to all versions of the specified application, the corporate perimeter 209b applies to any application published by the specified author, the corporate perimeter 209b applies to a specific version of the application, or others.

In some implementations, the device 200 may have an Application-Perimeter field describing whether the policy applies to applications within the perimeter (being local) or outside the perimeter (being external). A user field may enable description of whether the accessing policy applies to a specific user or all device users. A target field may enable definition of a file system path which can be used to specify which areas of the perimeter file system the policy applies to. The target field may not be required as the only area open for sharing has already been defined so that the target field may be useful when more open areas become available.

In some implementations, the device 200 may have a target-perimeter field that describes whether the perimeter policy applies to access of file system resources that are inside the perimeter (being local) or outside the perimeter (being external). A permissions field may describe what permissions the application described by the policy is allowed on the file system resource described by the policy.

Figure 3:
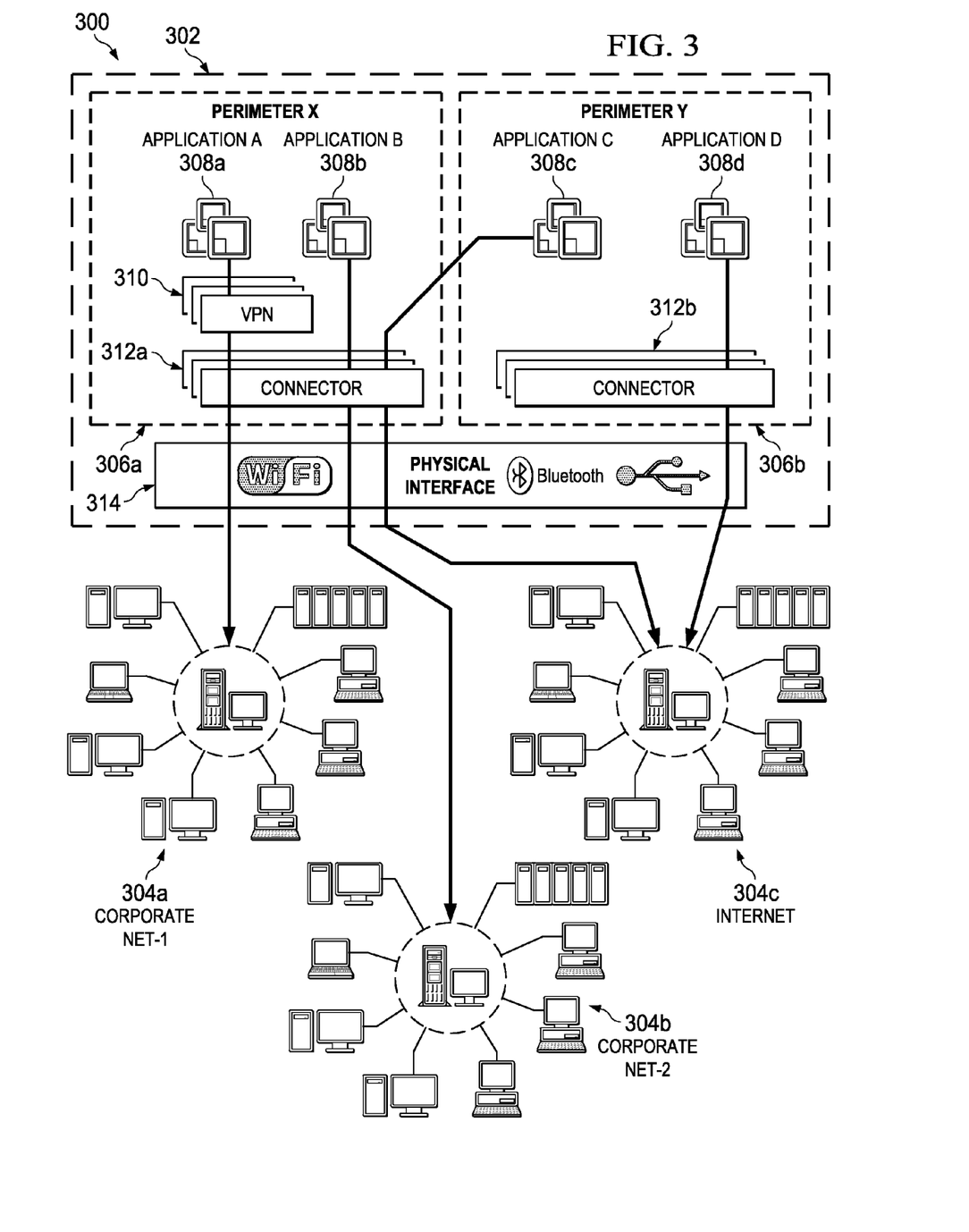
FIG. 3 is a schematic diagram illustrating access and communication across perimeters of a device.

FIG. 3 is a schematic diagram of an example system 300 illustrating access and communication across perimeters of network resources according to various embodiments of the present disclosure. In the illustrated implementation, the device 302 is configured to communicate with corporate networks 304a and 304b and the Internet 304c. The device 302 includes the perimeter 306a and the perimeter 306b. The perimeter 306a includes the applications 308a and 308b, and the perimeter 306b includes the applications 308c and 308d. The perimeter 306a may include a virtual private network 310 that securely connects the application 308a with the enterprise network 304a.

The perimeter 306a and the perimeter 306b may include the network access resource 312a and the network access resource 312b, respectively. The application 308b in the perimeter 306a connects to the enterprise network 304b through the connection 312a. In some implementations, the application 308c in the perimeter 306b crosses perimeters to access the resource or network access resource 312a in the perimeter 306a to connect to the internet 304c. For example, the application 308c may be a personal application (e.g., online game, social networking application) that access the internet 304c using the network access resources 312a of the perimeter 306a, which may be a corporate perimeter. The application 308d in the perimeter 306b connects to the internet 365 through the network access resource 312b in the perimeter 306b. All the aforementioned network connections 312 may be physically connected through a physical interface 314, which may use wireless, Bluetooth, Universal Serial Bus (USB), Radio Frequency Identification (RFID), Near Field Communication (NFC), or other connection technologies. In some implementations, the perimeter 306a may be a corporate perimeter, and the perimeter 306b may be a personal perimeter.

In summary, the schematic 300 illustrates cross-perimeter access using networks. The perimeter configurations may define association between a connection and the underlying network(s) the perimeter exposes. The perimeter configuration may define association between a virtual private network and the underlying network(s) the perimeter exposes. The virtual private network and connection configuration may be stored inside a perimeter along with the policies that govern the network and configuration usage.

In some implementations, the perimeter network policy may include fields including an application, an application-perimeter, and a network field. For example, the application field may describe the application to which the policy is assigned. The application field may include values that indicate the perimeter may be applied to all applications regardless of author, id, and/or version. The application field may have an Author-ID value that indicates the perimeter may be applied to any application published by the specified author. The application field may have an Application-ID value that indicates the perimeter may be applied to all versions of the specified application. The application field may have an Application-Version-ID value that indicates the perimeter may be applied to a specific version of the application.

In some implementations, the device 300 may further include perimeter encryption policy, which may include fields such as the file system path, encryption, etc. The field for file system path may contain values that describe the area of the file system to which the policy applies. The values in the encryption field may describe whether the file system contents should be encrypted or unencrypted.

In some implementations, the perimeter network policy may include an application-perimeter field that describes whether the policy applies to applications within the perimeter, such as the perimeter 306a or the perimeter 306b, or outside the perimeter. A network field may further include values that describe what networks the policy is governing. For example, the values may show all networks are under the policy, all network defined in the perimeter, any network defined outside the perimeter, or a specific network defined in the perimeter.

The applications 308a-d may be assigned to the respective perimeter 306 that each has been assigned to at startup. For example, the applications 308a and 308b can be assigned to the perimeter 306a, and the applications 308c and 308d may be assigned to the perimeter 306b. In some implementations, these assignments cannot be changed in flight or after the system startup while the operating system is running. The perimeter 306 may define the environment available to each application, for example, the file directories, network resources, device capabilities, and others. In some implementations, running an application 308 in a corporate perimeter 306 can point the application 308 to a corporate repository. Applications are then installed and managed in the corporate perimeter 306.

An application may be installed into several perimeters 306 concurrently (e.g., different versions, different licenses, etc.). In these perimeters 306, each perimeter installation may follow its own lifecycle. The perimeter administrator, such as the administrator 108 as shown in FIG. 1, may use a policy to describe which applications may or may not be installed inside the administrated perimeter. When viewing an existing resource (e.g., a media file, an online streaming video, a website, etc.), the view application may be automatically launched in the appropriate perimeter 306.

In the applications 308 within certain perimeters 306, when creating content and/or launching an application that is not associated with a resource, the perimeter context is to be stated explicitly. In certain cases, applications 308 may be shared between perimeters 306. For example, the installation directory with binaries may not be encrypted for the applications 308 to be shared. The applications 308 may be shared to all users, the same user, and/or a specific device user. When application 308 is shared, there may not be any associated user data to be shared with the application 308. In some implementations, the applications 308 execution inside a perimeter 308 may not use inter-process communication to communicate with applications executing outside the perimeter.

Figure 4:
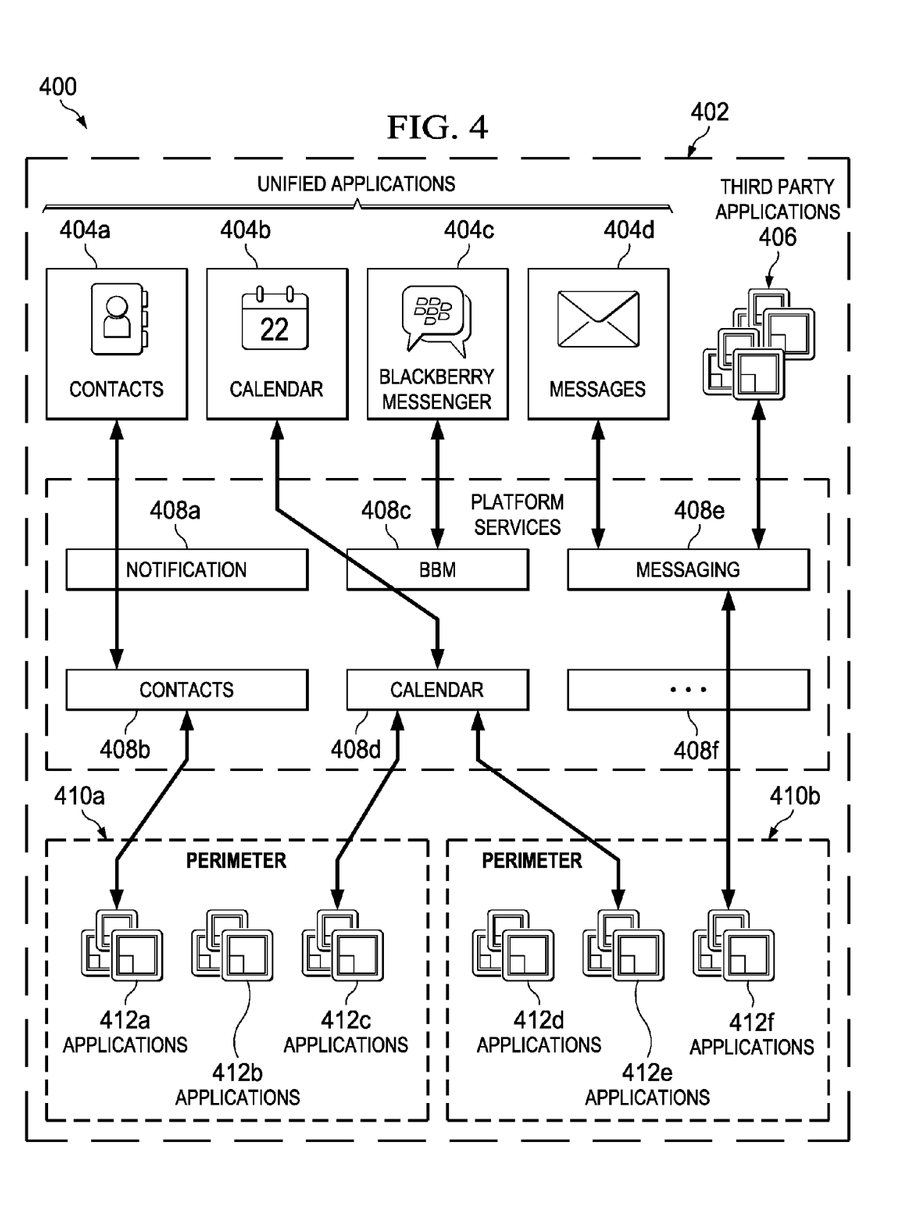
FIG. 4 is a schematic diagram illustrating cross-perimeter access to network access.

FIG. 4 is a schematic diagram of a system 400 illustrating access and communication across applications and platforms according to some implementations of the present disclosure. The device 402 includes a set of unified applications 404a-d and a set of third party applications 406. The device 402 further includes platform services 408a-f and perimeters 410a and 410b. The set of unified applications 404 and third-party applications 406 may directly communicate with the platform services 408. As illustrated, the unified applications 404 include a contacts application 404a, a calendar application 404b, a messenger application 404c, and a messaging application 404d. In some implementations, the unified applications 404 can provide a single seamless interface that presents the relevant data that is sourced across different perimeters as a single cohesive set. For example, the messaging application 404d may present a single unified access mechanism to email messages across all perimeters. The unified interface may also allow the user (and application) to deal with the data in a single way. For example, the user does not need to access multiple separate calendars in order to check availability across their personal and corporate events. A calendar unifies data across different perimeters may allow events to be presented together. The third party applications 406 may include any application provided by a third party, such as text editing applications, game applications, music or audio applications, multimedia applications, video editing applications, photo capture and editing applications, social media or social networking applications, shopping applications, news applications, a combination of any of the foregoing, or other applications.

The platform services 408 may include any software, hardware, or firmware configured to access different perimeters and provide retrieved data to the unified applications 410. The platform services 408 may include services for each type of service such as, for example, notifications, messaging, contacts, calendar, other digital assistance services, a combination of the foregoing or others. In some implementations, the device 402 may comprise a tablet computer (e.g., a PlayBook device) that integrates with specific experience. For example, the BlackBerry experience may permeate the device 402 and the perimeters 410 contained within. In these instances, the set of unified applications 404 may all be BlackBerry applications. Both the unified applications 404 and the third party applications 406 may be presented in a unified view that spans multiple perimeters 410 while minimizing or otherwise limiting data exposure.

The platform services 408 may span perimeters 410 and safeguard the perimeter data providing a unified view for both the unified applications 404 and the third party applications 406. For example, the graphical user interface may be governed by the platform services 408 that assemble display information without revealing the related data. The contacts 404a may be coupled with the contacts function in the platform services 408. The calendar 404b may be coupled with the calendar function in the platform services 408. The messenger 404c may be coupled with the messenger function in the platform services 408. The messages 404d and the third party applications 406 may both be coupled with the messaging function in the platform services 408.

In some implementations, the contacts function in the platform services 408 may correspond to the application 412a defined in the perimeter 410a. The calendar function in the platform services 408 may correspond to both the application 412c in the perimeter 410a and the application 412e in the perimeter 410b. The messaging function in the platform services 408 may correspond to the application 412f in the perimeter 410b. Therefore, the examples illustrated in FIG. 4 represent the various possibilities for the relationships established between applications and perimeters, and how the different relationships can be unified in the platform services 408 which reduce the data exposure.

For example, the calendar application 404a from each perimeter (there may be multiple perimeters that each define one calendar application 404a) can push minimal calendar data to cross-perimeter calendar service (e.g., date, time, optional subject, etc.), such as the platform services 408. The device may then present a unified view of the scheduled events. The event viewers are then executed inside the perimeter associated with the event. In another example, a browser may use a common application perimeter model through which the network access is dependent on the perimeter in which it executes.

In some implementations, a unified platform service can be used to show unified list entries. The list entries may include messaging, notifications, calendar, contacts, and other lists alike. The device 402 may include multiple certificate stores. Each perimeter may have its own store that can be managed by an administrator. Applications assigned to the perimeter may use the certificates in the local store only.

In some implementations, the enterprise connectivity may only be active over virtual private networks. Certain core application management may be authorized to upgrade the system. Certain perimeter application management may upgrade the system. Some upgrades may include updates of the perimeter applications. Crossing various perimeters, data may be backed-up and restored under certain policy specified conditions.

Figure 5:
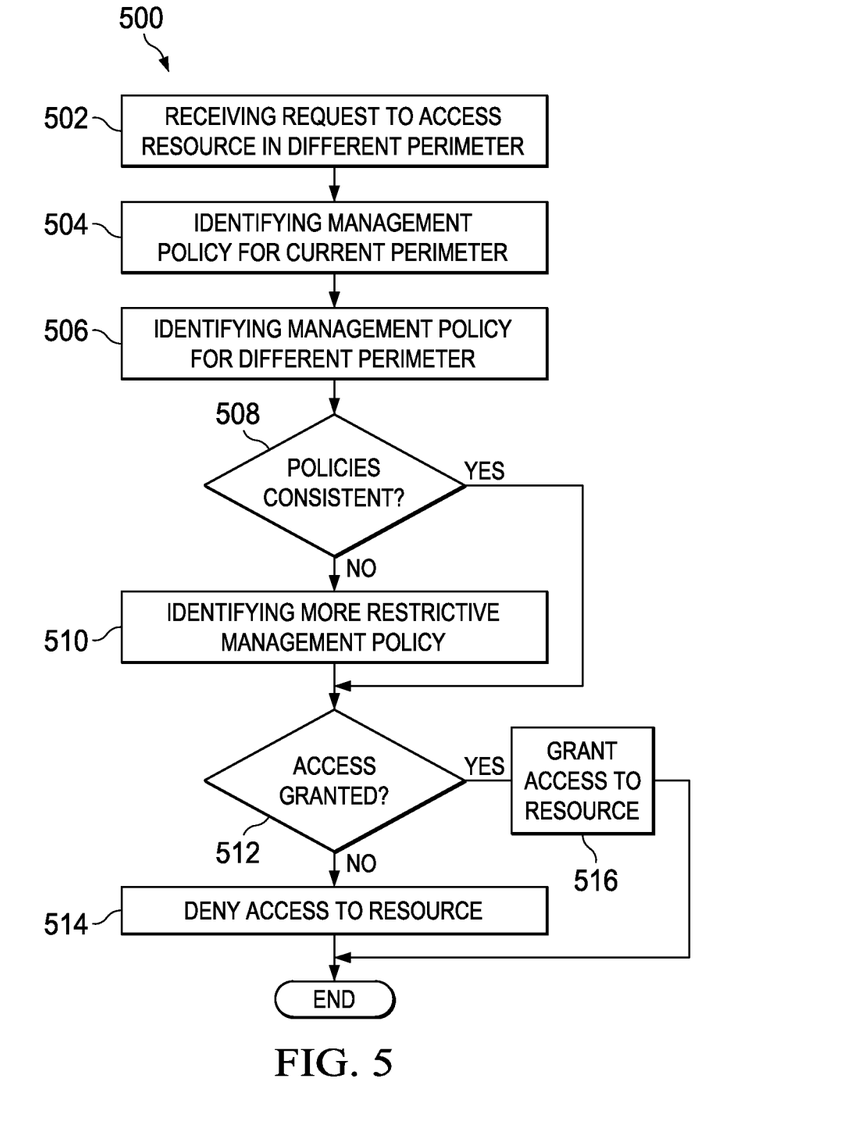
FIG. 5 is a flowchart illustrating an example method for enabling cross perimeter access.

FIG. 5 is a flowchart illustrating an example method 500 for enabling cross perimeter access. In particular, the method 500 includes identifying management policies for each perimeter and determining whether to grant access based on the identified policies. This method is for illustration purposes only and that the described or similar techniques may be performed at any appropriate time, including concurrently, individually, or in combination. In addition, many of the steps in the flowchart may take place concurrently and/or in different orders than as shown. Moreover, systems may use methods with additional steps, fewer steps, and/or different steps, so long as the methods remain appropriate.

Method 500 begins at step 502 where a request to access data in a different perimeter is received. For example, the device 102 of FIG. 1 may receive a request from an application 116a in the perimeter 110a to access the network access 114c in perimeter 110c. At step 504, the management policy for the current perimeter is identified. In the example, the device 102 may identify the policy 120a assigned to the perimeter 110a. Next, at step 506, the management policy for the target perimeter is identified. As for the example, the device 102 may identify the policy 120c assigned to the perimeter 110c. If the two policies are not consistent (for example, if there is a conflict between the policies) at decisional step 508, then, at step 510, the more restrictive policy is identified. Again in the example, the device 102 may determine that the policy 120a grants access to the network access resource 114c and the policy 120c grants limited access to the network access resource 114c. In these instances, the limited access may include granting access during certain time periods. If either policy does not grant access at decisional step 512, then, at step 514, the requesting resource is denied access to the target resource. If the policy does grant access, the requesting resource is allowed access to the resource. In the example, the device 102 may determine that the policy 120 or policies 120a and 120c allow access so the application 116a may access the network access resource 114c.

A number of implementations have been described. Nevertheless, it will be understood that various modifications may be made. Other variations in the order of steps are also possible. Accordingly, other implementations are within the scope of the following claims.

What is claimed is:

1. A method of managing access to resources in a device, comprising:
  receiving, by a hardware data processing apparatus on the device, from a first resource associated with a first plurality of resources defined on the device, a request to access a second resource associated with a second plurality of resources, wherein the device includes the first plurality of resources, the first resource, the second plurality of resources, and the second resource, and wherein the first plurality of resources and the second plurality of resources are logically separated and access between the first plurality of resources and the second plurality of resources is determined based on one or more management policies, the first plurality of resources including a first network connection profile and a first encryption certificate for the first plurality of resources, and the second plurality of resources including a second network connection profile and a second encryption certificate for the second plurality of resources, and wherein the request to access the second resource comprises a request to make a network connection by the first resource using the second network connection profile;
  determining, by a hardware data processing apparatus on the device, whether the request to make the network connection is prohibited based on a first management policy for the first plurality of resources and a second management policy for the second plurality of resources, the first management policy defining one or more rules for the first plurality of resources for accessing resources associated with the second plurality of resources including the second resource, the second management policy defining one or more rules for the second plurality of resources for allowing access to resources associated with the second plurality of resources including the second resource, and the determination comprises:
    if the first management policy prohibits the first resource to use any network connection profiles included in the second plurality of resources to make the network connection, prohibiting the request to make the network connection; and
    if the second management policy prohibits the resources outside of the second plurality of resources to use any network connection profiles included in the second plurality of resources to make the network connection, prohibiting the request to make the network connection;
  when the request to make the network connection is granted, enabling the first resource associated with the first plurality of resources to use the second network connection profile to make the network connection.

2. The method of claim 1, further comprising:
  receiving a request to grant administrative access to resources associated with the second plurality of resources; and
  prohibiting administrative access to resources associated with the second plurality of resources.

3. The method of claim 1, wherein the device comprises a tablet computer.

4. The method of claim 1, wherein the first plurality of resources comprises a personal plurality of resources, and the second plurality of resources comprises a corporate plurality of resources.

5. The method of claim 1, wherein an enterprise is granted administrative access to the first plurality of resources, and a user is granted administrative access to the second plurality of resources.

6. The method of claim 1, wherein the first management policy comprises a personal management policy, and the second management policy comprises a corporate management policy.

7. The method of claim 1, further comprising:
  receiving, through user input, a configuration of at least one access setting in the first management policy.

8. The method of claim 1, further comprising:
  receiving, from a corporate administrator, a configuration of at least one access setting in the second management policy.

9. The method of claim 1, wherein the second resource comprises data associated with at least one of a corporate messaging account, a corporate calendar account, or a corporate contact database.

10. The method of claim 1, further comprising when the request to make the network connection is prohibited, preventing the first resource associated with the first plurality of resources from using the second network connection profile to make the network connection.

11. A device, comprising:
  a first plurality of resources associated with a first resource and a first management policy, the first management policy defining one or more rules for accessing resources associated with the second plurality of resources including the second resource, wherein the first plurality of resources including a first network connection profile and a first encryption certificate for the first plurality of resources;
  a second plurality of resources associated with a second resource and a second management policy, the second management policy defining one or more rules for allowing access to resources associated with the second plurality of resources including the second resource, wherein the second plurality of resources including a second network connection profile and a second encryption certificate for the second plurality of resources, the first plurality of resources and the second plurality of resources being logically separated; and
  one or more hardware processors operable to:
    receive, from the first resource associated with the first plurality of resources on the device a request to access the second resource associated with the second plurality of resources, wherein the device includes the first plurality of resources, the first resource, the second plurality of resources, and the second resource, wherein the request to access the second resource comprises a request to make a network connection by the first resource using the second network connection profile;

determine whether the request to make the network connection is prohibited based on the first management policy for the first plurality of resources and the second management policy for the second plurality of resources, wherein the determination comprises:
   if the first management policy prohibits the first resource to use any network connection profiles included in the second plurality of resources to make the network connection, prohibiting the request to make the network connection; and
   if the second management policy prohibits the resources outside of the second plurality of resources to use any network connection profiles included in the second plurality of resources to make the network connection, prohibiting the request to make the network connection;
when the request to make the network connection is granted, enable the first resource associated with the first plurality of resources to use the second network connection profile to make the network connection.

12. The device of claim 11, the one or more processors further operable to:
receive a request to grant administrative access to resources associated with the second plurality of resources, wherein the request identifies an administrator;
determine the identified administrator is different from an administrator associated with the second plurality of resources; and
prohibit administrative access to resources associated with the second plurality of resources.

13. The device of claim 11, wherein the device comprises a tablet computer.

14. The device of claim 11, wherein the one or more hardware processors is operable to: when the request to make the network connection is prohibited, prevent the first resource associated with the first plurality of resources from using the second network connection profile to make the network connection.

15. A computer program product encoded on a tangible, non-transitory storage medium, the product comprising computer readable instructions for causing one or more processors to perform operations comprising:
   receiving, by a hardware data processing apparatus on the device, from a first resource associated with a first plurality of resources defined on the device, a request to access a second resource associated with a second plurality of resources, wherein the device includes the first plurality of resources, the first resource, the second plurality of resources, and the second resource, and wherein the first plurality of resources and the second plurality of resources are logically separated and access between the first plurality of resources and the second plurality of resources is determined based on one or more management policies, the first plurality of resources including a first network connection profile and a first encryption certificate for the first plurality of resources, and the second plurality of resources including a second network connection profile and a second encryption certificate for the second plurality of resources, and wherein the request to access the second resource comprises a request to make a network connection by the first resource using the second network connection profile;
   determining, by a hardware data processing apparatus on the device, whether the request to make the network connection is prohibited based on a first management policy for the first plurality of resources and a second management policy for the second plurality of resources, the first management policy defining one or more rules for the first plurality of resources for accessing resources associated with the second plurality of resources including the second resource, the second management policy defining one or more rules for the second plurality of resources for allowing access to resources associated with the second plurality of resources including the second resource, and the determination comprises:
      if the first management policy prohibits the first resource to use any network connection profiles included in the second plurality of resources to make the network connection, prohibiting the request to make the network connection; and
      if the second management policy prohibits the resources outside of the second plurality of resources to use any network connection profiles included in the second plurality of resources to make the network connection, prohibiting the request to make the network connection;
   when the request to make the network connection is granted, enabling the first resource associated with the first plurality of resources to use the second network connection profile to make the network connection.

16. The computer program product of claim 15, the operations further comprising:
receiving a request to grant administrative access to resources associated with the second plurality of resources, wherein the request identifies an administrator;
determining the identified administrator is different from an administrator associated with the second plurality of resources; and
prohibiting administrative access to resources associated with the second plurality of resources.

17. The computer program product of claim 15, wherein the device comprises a tablet computer.

18. The computer program product of claim 15, the operations further comprising when the request to make the network connection is prohibited, preventing the first resource associated with the first plurality of resources from using the second network connection profile to make the network connection.

* * * * *